(12) United States Patent
Fadell

(10) Patent No.: US 7,546,083 B2
(45) Date of Patent: Jun. 9, 2009

(54) MULTIMEDIA DATA TRANSFER FOR A PERSONAL COMMUNICATION DEVICE

(75) Inventor: Anthony M. Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 460 days.

(21) Appl. No.: 11/339,068

(22) Filed: Jan. 24, 2006

(65) Prior Publication Data

US 2007/0173231 A1    Jul. 26, 2007

(51) Int. Cl.
    *H04B 3/36*    (2006.01)
(52) U.S. Cl. .................. 455/3.06; 455/3.05; 455/79; 455/563
(58) Field of Classification Search ............... 455/3.05, 455/79, 563, 413
    See application file for complete search history.

(56) References Cited

U.S. PATENT DOCUMENTS

| 7,027,836 | B2 * | 4/2006 | Zacks et al. ................. 455/557 |
| 7,069,211 | B2 * | 6/2006 | Chiu et al. .................. 704/221 |
| 7,373,141 | B2 * | 5/2008 | Kwon ....................... 455/414.4 |
| 2005/0286481 | A1 * | 12/2005 | Fadell ......................... 370/342 |
| 2006/0146765 | A1 * | 7/2006 | Van De Sluis et al. ...... 370/338 |

\* cited by examiner

*Primary Examiner*—Nick Corsaro
*Assistant Examiner*—Vladimir Magloire
(74) *Attorney, Agent, or Firm*—Beyer Law Group LLP

(57) ABSTRACT

In a portable multimedia device, data is passed between a sender and receiver unit by way of voice channel only. Multimedia data is vocalized and then forwarded to a receiver unit by way of the voice channel without the use of a backend server. Once received at the receiver unit, the vocalized data can be converted to an audio signal that can then output by way of an audio output device (such as a speaker, earphone, etc.).

14 Claims, 6 Drawing Sheets

MULTIMEDIA DATA TRANSFER FOR A PERSONAL COMMUNICATION DEVICE

BACKGROUND OF THE INVENTION

1. Field of Invention

This invention relates generally to multimedia devices. More specifically, the invention describes a system for providing multimedia data to a mobile personal communication device. Such devices include but are not limited to cell phones, walkie-talkies, etc.

2. Description of Related Art

Recent developments in consumer electronics have included the introduction of portable personal communication devices such as cell phones, personal walkie-talkies, and the like. A common use for such personal communication devices is the sending and receiving of text messages. However, conventional text messaging systems require the use of what is referred to as a backend server that may be limited in the amount of information that can be handled at a particular time and is therefore capacity limited. Furthermore, the reading of text messages can be troublesome due to in part to the small size of the typical display screen or the inability to control ambient light conditions. This is particularly troublesome to those users having impaired vision where reading a text message, of any reasonable size, for example, is difficult.

What is required is a system that provides for vocalization of multimedia data by a personal communication device for transmission over an associated voice channel.

SUMMARY OF THE INVENTION

The invention described herein pertains to method of transferring multimedia data between personal communication devices by vocalizing the multimedia data by a first personal communication device, passing the vocalized multimedia data to a second personal communication device using only a voice channel, and receiving the vocalized multimedia data by the second personal communication device.

In another embodiment, a consumer product suitable transferring multimedia data between personal communication devices without a backend server is described that includes a memory device arranged to store the multimedia data, a display coupled to the memory device suitable for displaying the multimedia data, a wireless interface arranged to establish a voice channel between the consumer product and any of the personal communication devices and an audio output device for outputting an audible signal. A processor fetches the multimedia data from the memory, vocalizes the multimedia data and passes the vocalized multimedia data to the wireless interface that subsequently passes the vocalized multimedia data by way of the voice channel to at least one of the personal communication devices.

Computer program product executable by a processor for transferring multimedia data between personal communication devices without a backend server, is also described. The computer program product includes computer code for vocalizing the multimedia data by a first personal communication device, computer code for passing the vocalized multimedia data to a second personal communication device using only a voice channel, computer code for receiving the vocalized multimedia data by the second personal communication device and computer readable medium for storing the computer code.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

With the rapid deployment, proliferation, and technical advancement of mobile personal communication devices, such as cell phones, a user of these devices is presented with any number of ways to communicate with another user. For example, a user can send type a text message using, for example, Short Message Service-Point to Point (SMS-PP) protocol as defined in GSM recommendation 03.40 where messages are sent via a store-and forward mechanism to a Short Message Service Center (SMSC), which will attempt to send the message to the recipient and possibly retry if the user is not reachable at a given moment. Therefore, SMS-PP requires the use of a backend server to provide the necessary support for transmission of data between sender and receiver.

The invention, however, provides a mechanism whereby data is passed between a sender and receiver unit by way of voice channel only bypassing use of the data channel used in conventional arrangements. In this way, a sender can select that data which he/she desires to send to a receiver unit using by first converting the data into an appropriate vocal/voice format which is then forwarded to a receiver unit by way of the voice channel. Once received at the receiver unit, the vocalized data can be converted to an audio signal, which is then output by way of an audio output device (such as a speaker, earphone, etc.). This arrangement is particularly well suited for people having visual problems or in those situations where viewing the data on a small display screen (typical of most personal communication devices) is problematic.

In one embodiment, In a particular embodiment, the personal communication device is a pocket sized cell phone that in addition to the standard voice function of a telephone can support many additional services such as SMS for text messaging packet switching for access to the Internet and MMS for sending and receiving photos and video.

Figure 1:
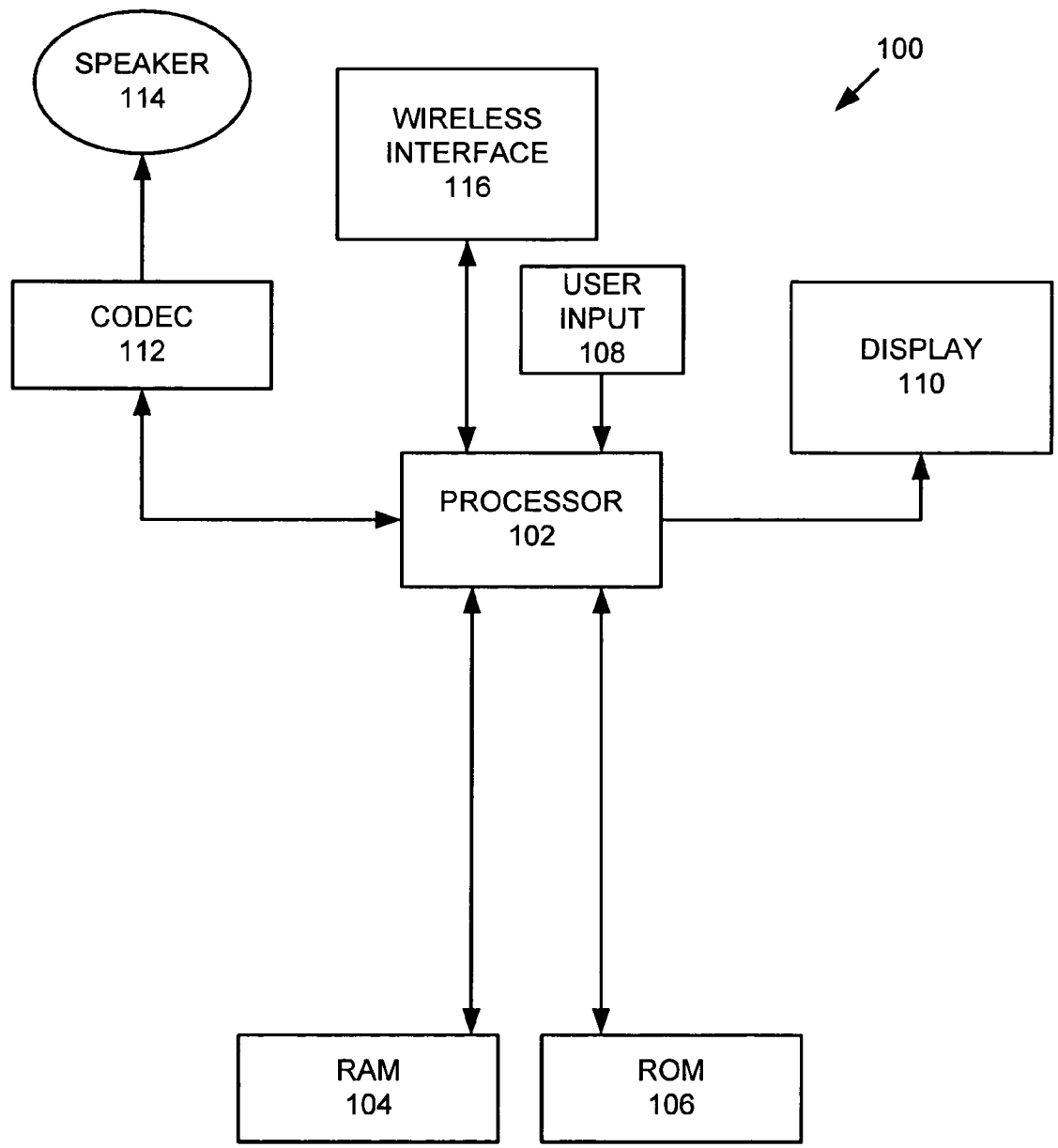
FIG. 1 shows an exemplary portable multimedia device in accordance with an embodiment of the invention.

Accordingly, FIG. 1 shows an exemplary personal communication device 100 (such as a cell phone) in accordance with an embodiment of the invention. The cell phone 100 includes a processor 102 that pertains to a microprocessor or controller for controlling the overall operation of the cell phone 100 that stores data in a RAM 104 and a Read-Only Memory (ROM) 106. The ROM 106 can store programs, utilities or processes to be executed in a non-volatile manner whereas the RAM 104 provides volatile data storage such as currently called phone numbers, ring tones, etc. The cell phone 100 also includes a user input device 108 that allows a user to interact with the cell phone 100. For example, the user input device 108 can take a variety of forms, such as a button, keypad, dial, etc. Still further, the cell phone 100 includes a display 110 (screen display) that can be controlled by the processor 102 to display information to the user. A data bus can facilitate data transfer between at least the ROM 106, RAM 104, the processor 102, and a CODEC 112 that produces analog output signals for an audio output device 114 (such as a speaker). The speaker 114 can be a speaker internal to the cell phone 100 or external to the cell phone 100. For example, headphones or earphones that connect to the cell phone 100 would be considered an external speaker. A wireless interface 116 operates to receive information from the processor 102 that opens a channel (either voice or data) for transmission and reception typically using RF carrier waves.

Figure 2:
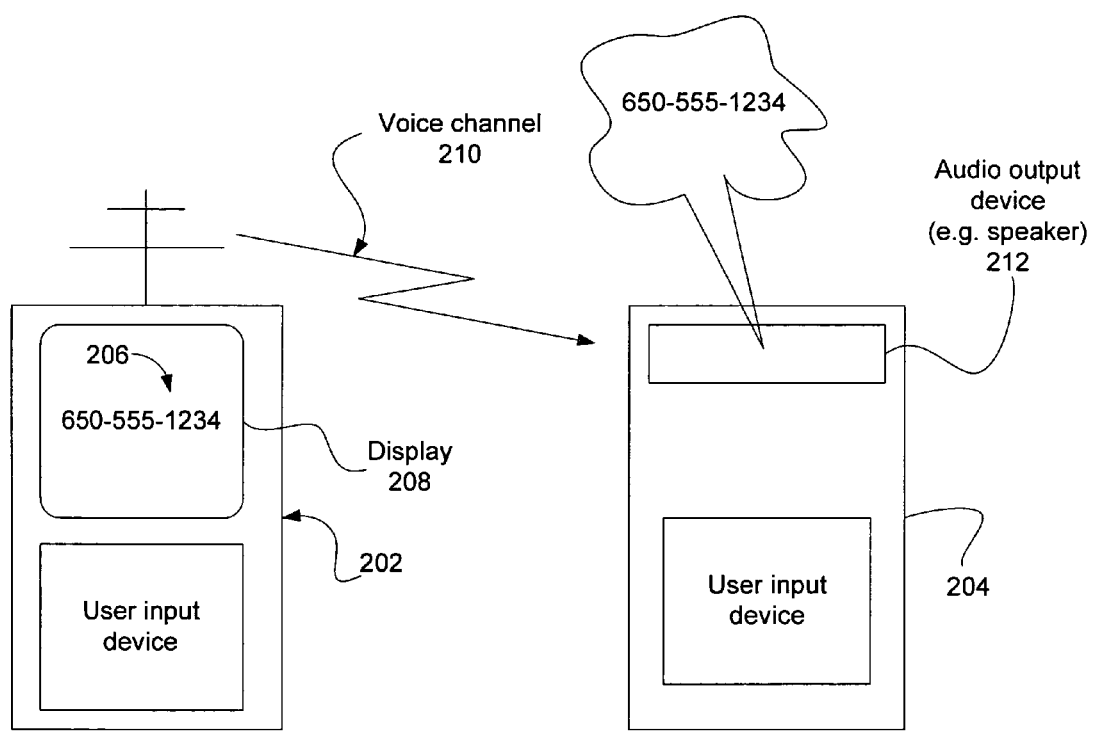
FIGS. 2 and 3 shows a system having a cell phone arranged to pass vocalized multimedia data to a receiver unit in accordance with an embodiment of the invention.

FIG. 2 shows a system 200 having a cell phone 202 arranged to pass vocalized multimedia data to a receiver unit 204 in accordance with an embodiment of the invention. It should be noted that the system 200 can be used by any number of cell phones or other compatible personal communication devices and is not therefore limited to only the particular embodiment shown in FIG. 2. Accordingly, when the cell phone 202 is actively displaying multimedia data 206 on a display screen 208, a user has the option of having the cell phone 202 vocalize the displayed data (which in this example is a phone number "650 555-1234") in order to be passed by way of a voice channel 210 to the receiver unit 204 (in this case another cell phone) or any number of other cell phones or compatible personal communication devices.

Figure 3:
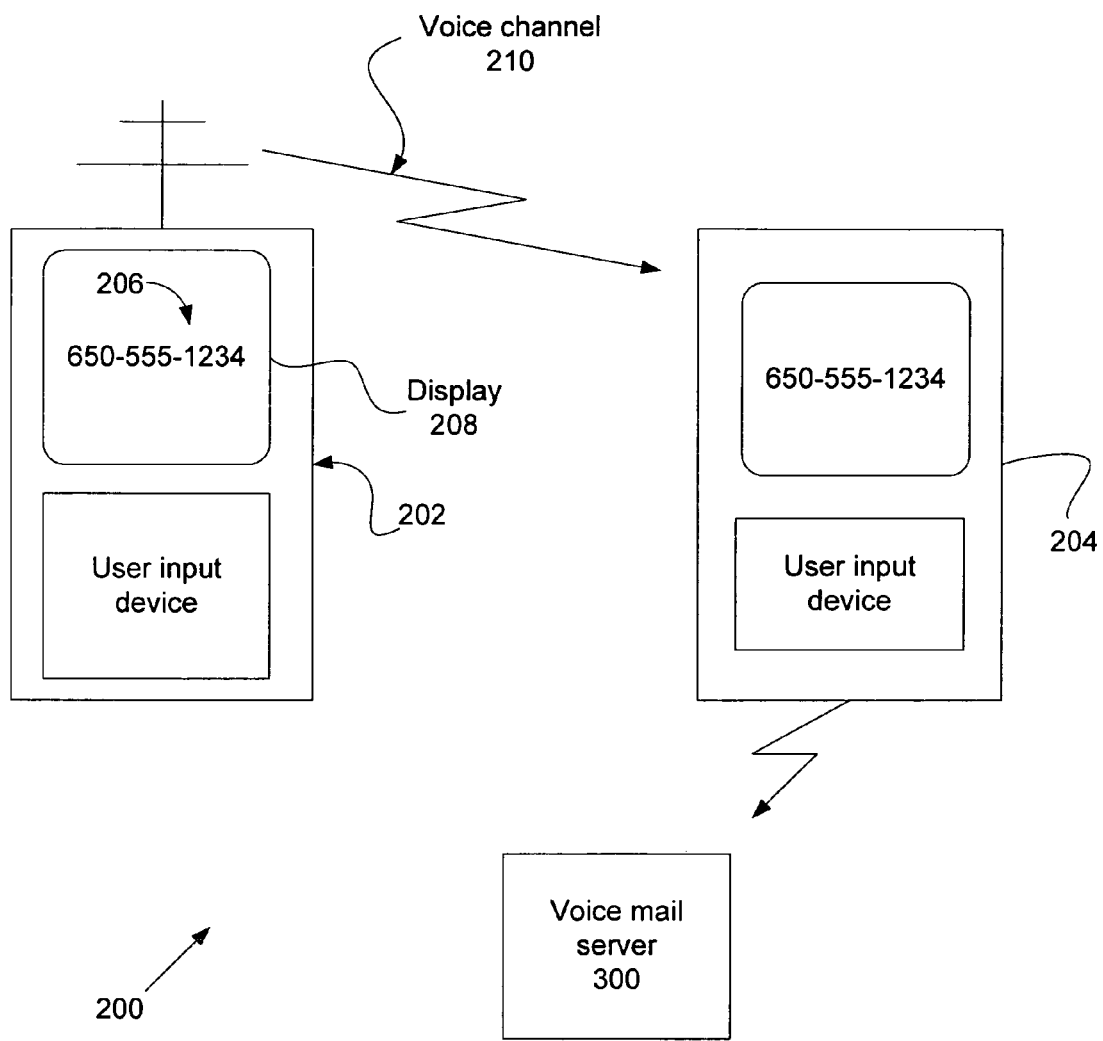

Once received at the cell phone 204, processing of the vocalized data can be performed based upon a prompted user request or based upon a pre-selected protocol. For example, once received at the cell phone 204, the vocalized phone number can be passed to an audio output device 212 that (in the case of a speaker) generates an audible rendition of the vocalized phone number. In another case (shown in FIG. 3), the vocalized phone number is forwarded to a voice mail server 300 where the receiver records the vocalized phone number as a voice mail message for subsequent playback. It should be noted that in this case, the sender can pre-select this option for those cases where the sender wishes to generate a simple text message and instead of having the text message displayed on the receiver's display screen, the vocalized text message is stored in the receiver's voice mail server.

Figure 4:
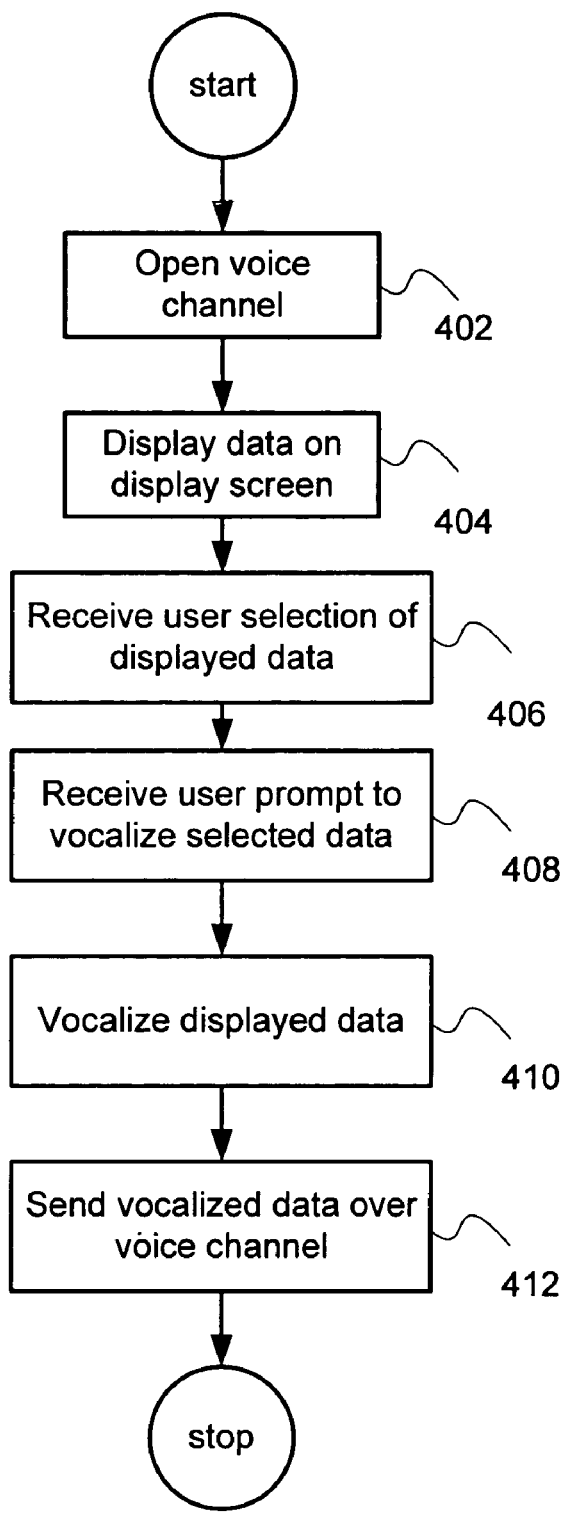
FIG. 4 shows a flowchart illustrating a particular process for transferring multimedia data over a voice channel in accordance with an embodiment of the invention.

FIG. 4 shows a flowchart illustrating a particular process 400 for transferring multimedia data over a voice channel in accordance with an embodiment of the invention. Accordingly, at 402, voice channel is opened or otherwise made available for transmission of the multimedia data. At 404, multimedia data is displayed on a display screen. In the described embodiment, various user selectable icons are available for selecting some or all of the displayed multimedia data. For example, if the displayed multimedia data is textual in nature (such as a phone number or short test message), a pointer can be used to point to and select the portion of the text to send. Therefore, at 406 a user selection of the displayed multimedia data (or portion thereof) is received along with a user prompt at 408 that causes the cell phone to vocalize the selected multimedia data in preparation for transmission over the available voice channel. At 410, the selected multimedia data is vocalized and transmitted over the voice channel at 412 to a receiver unit.

Figure 5:
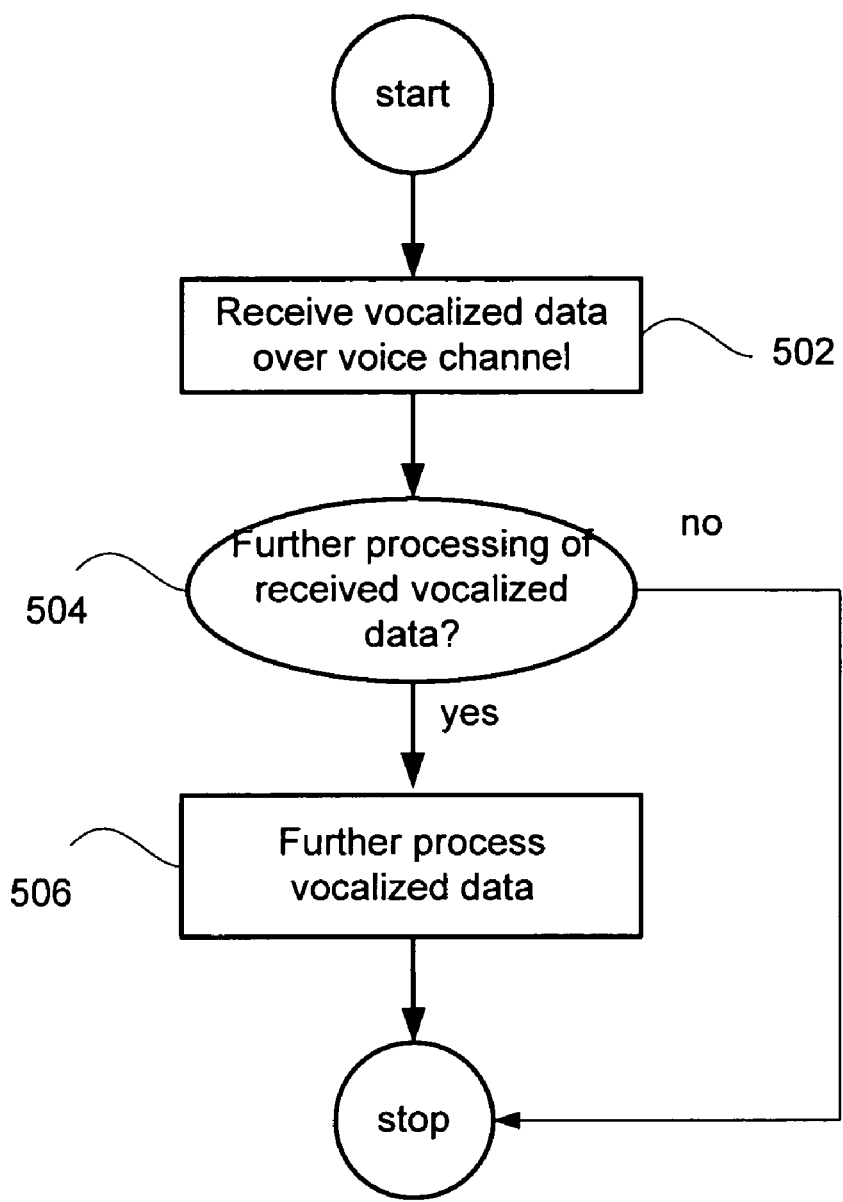
FIG. 5 shows a flowchart detailing a process for receiving vocalized multimedia data in accordance with an embodiment of the invention.

FIG. 5 shows a flowchart detailing a process 500 for receiving vocalized multimedia data in accordance with an embodiment of the invention. The process 500 begins at 502 by receiving the vocalized multimedia data over the voice channel. If, at 504, it is determined that there is no further processing, then the process 500 stops, otherwise, the vocalized multimedia data is further processed at 506. By further processing, it is meant that once the vocalized multimedia data is received, there are any number of additional processing that can be performed, such as passing the vocalized multimedia data to an output audio device (such as a speaker, headphone jack, etc.) for conversion to an audible version of the vocalized multimedia data. In some cases, default additional processing can be performed whereby any vocalized multimedia data received is automatically converted back to text and displayed and/or converted to an audible message.

Figure 6:
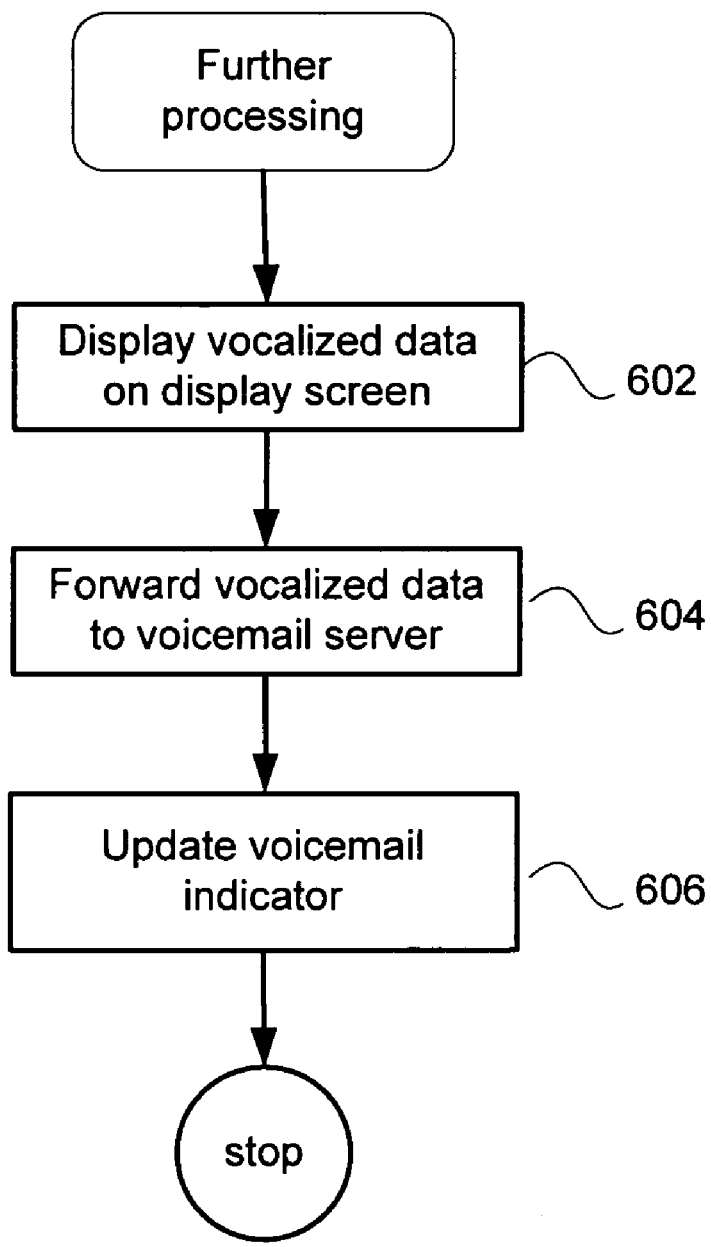
FIG. 6 shows a flowchart detailing a process for forwarding the vocalized multimedia data to a voicemail server in accordance with an embodiment of the invention.

For example, FIG. 6 shows a flowchart detailing a process 600 for forwarding the vocalized multimedia data to a voice-mail server in accordance with an embodiment of the invention. The process 600 begins at 602 by (optionally) displaying the vocalized multimedia data and forwarding the vocalized multimedia data to a voice mail server at 604 and updating a voice mail indicator at 606 indicating that a new voice mail message has been recorded.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. Computer readable medium arranged to store instructions executable by a processor for transferring multimedia data between a first personal communication device and at least another personal communication device without a back-end server, comprising:

computer code for vocalizing the multimedia data by the first personal communication device;

computer code for selecting by a user of the first personal communication device a manner in which the vocalized multimedia data is processed by the at least another personal communication device;

computer code for generating a prompt indicating the manner selected by the user in which the at least another personal communication device processes the vocalized multimedia data, wherein the at least another personal communication device processes the vocalized multimedia data only in accordance with the user generated prompt; and computer code for passing only the vocalized multimedia data and the prompt to the at least another personal communication device from the first personal communication device using only a voice channel.

2. Computer readable medium as recited in claim 1, further comprising;

computer code for displaying a user activated selection tool for selecting the multimedia data at the first personal communication device; and computer code for receiving a user generated selection prompt indicating the multimedia data to be vocalized.

3. Computer readable medium as recited in claim 1, wherein the at least another personal communication device converts the vocalized multimedia data to text and presents the text to a user of the at least another personal communication device in accordance with the prompt received from the first personal communication device.

4. Computer readable medium as recited in claim 2, wherein in response to the prompt received from the first communication device, the at least another personal communication device opens a channel to a voice mail server, audibilizes the vocalized multimedia data, forwards the audibilized multimedia data to the voice mail server, and updates a voice mail indicator.

5. Computer readable medium as recited in claim 1 wherein the at least another personal communication device is a cell phone or a personal digital assistant.

6. Computer readable medium as recited in claim 1 wherein the multimedia data is a text message and wherein in response to the prompt, the at least another personal communication device displays the text message, audibilizes the text message, opens a channel to a voice mail server, and forwards the audibilized text message to the voice mail server.

7. A method of transferring multimedia data from a first personal communication device to a second personal communication device without a backend server, comprising:

at the first personal communication device, by a sender, selecting the multimedia data to be transferred to the second personal communication device;

vocalizing the selected multimedia data;

by the sender, selecting a manner in which the vocalized multimedia data is processed by the second personal communication device;

generating a prompt indicating the manner selected by the user in which the second personal communication device processes the vocalized multimedia data, wherein the second personal communication device processes the vocalized multimedia data only in accordance with the user generated prompt;

establishing a voice channel between the first and second personal communication devices; and passing only the user generated prompt and the vocalized multimedia data to the second personal communication device using only the voice channel.

8. A method as recited in claim 7, further comprising;

at the second personal communication device, receiving the prompt and the vocalized multimedia data; and further processing the received vocalized multimedia data in the the manner directed by the prompt.

9. A method as recited in claim 8, wherein the further processing of the received vocalized multimedia data by the second personal communication device comprises:

converting the vocalized multimedia data to an audible signal;

passing the audible signal to an audio output device; and outputting the audible signal corresponding to the vocalized multimedia data.

10. A method as recited in claim 8, wherein the further processing of the received vocalized multimedia data by the second personal communication device comprises:

wherein the multimedia data is a text message and wherein in response to the prompt, the second personal communication device displays the text message, audibilizes the text message, opens a channel to a voice mail server, and forwards the audibilized text message to the voice mail server.

11. A consumer product suitable for sending multimedia data to at least another personal communication device having an audio output device without a backend server, comprising:

a memory device arranged to store the multimedia data;

a display coupled to the memory device suitable for displaying the multimedia data;

a wireless interface arranged to establish a voice channel between the consumer product and the at least another personal communication device; and a processor arranged to vocalize multimedia data selected by a user of the consumer product, generate a prompt indicating a manner selected by the user of the consumer product in which the at least another personal communication device processes the vocalized multimedia data and pass only the vocalized multimedia data and the prompt to the at least another personal communication device using only a voice channel.

12. A consumer product as recited in claim 11, wherein at least another personal communication device receives the vocalized multimedia data and processes the received vocalized multimedia data only in accordance with the prompt.

13. A consumer product as recited in claim 12, wherein the processing of the received vocalized multimedia data by the second personal communication device comprises:

converting the vocalized multimedia data to an audible signal and a corresponding text message;

passing the audible signal to the audio output device;

displaying the text message; and outputting the audible signal corresponding to the vocalized multimedia data.

14. A method as recited in claim 12, wherein the multimedia data is a text message and wherein in response to the prompt, the at least another personal communication device displays the text message, audibilizes the text message, opens a channel to a voice mail server, and forwards the audibilized text message to the voice mail server.

* * * * *